US012583994B2

(12) United States Patent
Abiodun et al.

(10) Patent No.: US 12,583,994 B2
(45) Date of Patent: Mar. 24, 2026

(54) UV LASER-MARKABLE COLORED WIRE INSULATION MATERIAL

(71) Applicant: Altamira Material Solutions, Houston, TX (US)

(72) Inventors: Samuel Abiodun, Cypress, TX (US); Rodrigo Costa, Houston, TX (US); Andrew Bastian, Cypress, TX (US)

(73) Assignee: Altamira Material Solutions, Houston, TX (US)

( * ) Notice: Subject to any disclaimer, the term of this patent is extended or adjusted under 35 U.S.C. 154(b) by 266 days.

(21) Appl. No.: 18/263,981

(22) PCT Filed: Feb. 8, 2022

(86) PCT No.: PCT/US2022/015699
§ 371 (c)(1),
(2) Date: Aug. 2, 2023

(87) PCT Pub. No.: WO2022/173765
PCT Pub. Date: Aug. 18, 2022

(65) Prior Publication Data
US 2024/0092995 A1      Mar. 21, 2024

Related U.S. Application Data

(60) Provisional application No. 63/147,645, filed on Feb. 9, 2021.

(51) Int. Cl.
*B41M 5/26*       (2006.01)
*C08K 3/04*       (2006.01)
(Continued)

(52) U.S. Cl.
CPC .............. *C08K 3/04* (2013.01); *B41M 5/267* (2013.01); *C08K 3/2279* (2013.01); *C08K 3/36* (2013.01);
(Continued)

(58) Field of Classification Search
CPC ........ B41M 5/267; C08K 3/04; C08K 3/2279; C08K 3/36; C08K 9/02; C08K 2003/2241; C08K 2201/014; H01B 13/348
See application file for complete search history.

(56) References Cited

U.S. PATENT DOCUMENTS

2002/0155291 A1    10/2002    Daga et al.
2012/0027958 A1     2/2012    Thaker
(Continued)

FOREIGN PATENT DOCUMENTS

WO          2012104006 A1     8/2012
WO      WO-2018069413 A1 *    4/2018    .......... B41M 7/0054

OTHER PUBLICATIONS

Extended European Search Report, Application No. 22753222.3, mailed Dec. 4, 2024, 9 pgs.
(Continued)

*Primary Examiner* — Gerard Higgins
(74) *Attorney, Agent, or Firm* — Perkins Coie LLP

(57)        ABSTRACT
Laser-markable dark-colored insulation materials that produce light-color marking with remarkably high contrast and durability, when marked with UV laser, are disclosed. Also disclosed are materials, synthesis, and application of the laser-markable insulation materials, and methods of making the insulation materials.

13 Claims, 1 Drawing Sheet

(51) Int. Cl.
    *C08K 3/22*        (2006.01)
    *C08K 3/36*        (2006.01)
    *C08K 9/02*        (2006.01)
    *H01B 13/34*     (2006.01)

(52) U.S. Cl.
    CPC ........ *C08K 9/02* (2013.01); *C08K 2003/2241*
           (2013.01); *C08K 2201/014* (2013.01); *H01B*
                       *13/348* (2013.01)

(56)             References Cited

U.S. PATENT DOCUMENTS

2016/0019997 A1    1/2016  Adamchuk et al.
2018/0273730 A1    9/2018  Rueger et al.

OTHER PUBLICATIONS

PCT/US2022/15699 International Search Report and Written Opinion, mailed May 3, 2022, 15 pgs. total.

\* cited by examiner

UV LASER-MARKABLE COLORED WIRE INSULATION MATERIAL

CROSS-REFERENCE TO RELATED APPLICATION(S)

This application claims priority to U.S. Provisional Patent Application No. 63/147,645, filed Feb. 9, 2021, entitled "UV Laser-Markable Colored Wire Insulation Material," the entirety of which is hereby incorporated by reference.

FIELD

The present disclosure relates to ultraviolet (UV) laser-markable dark-colored insulation material that produce light-color marking with high contrast. The disclosure also relates to the materials, synthesis, and application of the UV laser-markable insulation materials, and methods of making the insulation materials.

BACKGROUND

Fluoropolymers are generally used in making insulation materials, such as electrical tapes to wrap around conductive materials for use in electrical wires and cables. Ultraviolet (UV) laser marking on the surface of the insulation materials is one of the preferred methods for identifying specific wires or cables with numbers, letters, signs or other distinguishing marks.

It is desirable that the mark on the surface of the insulation materials is legible with high initial contrast and long-term durability. UV laser markable insulation materials are well-known in the art, which provide a UV laser marking additive systems such as titanium dioxide and other metallic oxides in fluoropolymer insulation and method of material processing producing dark-colored (such as black) markings on light-colored (such as white) insulating materials (see for example, U.S. Pat. No. 9,881,714B2; U.S. Pat. No. 6,825,265 B2; EP 0447032 A2; U.S. Pat. No. 9,150,702 B2; S. Abiodun, R. Costa, Durable and High Contrast UV Laser Markings in PTFE Wire Insulations IWCS October 2020 (publication pending); S. C. Dass, "Interaction of Lasers with Plastics and Other Materials," in Coloring Technology for Plastics, Elsevier, p. 289-294 (1999); and T. Van Der Ploeg, "laser-marking-aids-product-identification-1999," Reinforced Plastics, vol. 43, no. 5, p. 50-51 (May 1999)).

All above listed and related art report high contrast between the dark markings and the background insulating material for white insulation materials/backgrounds, however there is no report of such high contrast that has been found for dark-colored insulation materials/backgrounds. In fact, it is known in the art that contrast between laser markings and background insulating material is usually low when the insulating material is of dark color (at least lower than white backgrounds).

Because dark-colored, and specifically black or carbon black-based, insulation materials are desirable for wires, cables, and related applications, there is an unmet need in the industry for a UV laser markable dark-colored insulation materials that produce light-colored (white) marking with high initial contrast.

SUMMARY

This disclosure describes, among other things, a laser-markable dark-colored insulation material that produces light-color marking with high initial and post-heat aging contrast. The disclosure also describes insulation material that can yield white markings on dark-colored (such as black) fluoropolymer insulation with an extra-high initial contrast (such as >70%) on the dark-colored insulating materials (backgrounds) when marked with UV laser.

One aspect of this disclosure is directed to a method of preparing a UV laser-markable dark-colored insulation material that produces light-color marking with high initial and post-heat aging contrast, where the insulation material comprises: (i) fluoropolymer up to 100 phr (parts per hundred resin); (ii) color pigment in an amount ranging from 1 to 20 phr; and (iii) UV laser-marking additive in an amount ranging from 1 to 20 phr. A related aspect relates to the product formed by such a process.

A portion of this disclosure is directed to a UV laser-markable insulation material, where the fluoropolymer is polytetrafluoroethylene (PTFE); the UV laser-marking additive is a mixture of mica, titanium dioxide, silicon dioxide, and antimony-doped tin oxide or mica coated with titanium dioxide, silicon dioxide, and antimony-doped tin oxide; and the color pigment includes dark colors such as black, blue, red, brown, green, orange, or the like.

This disclosure also describes a UV laser-markable dark-colored insulation material which may comprise a polymeric material selected from the group consisting of: perfluoro-alkoxy alkanes (PFA or PFAs when plural); polytetrafluoroethylene (PTFE); fluorinated ethylene propylene (FEP) and its copolymers; expanded-polytetrafluoroethylene (ePTFE, or EPTFE); expanded-fluorinated ethylene propylene (eFEP or EFEP); perfluoromethylvinylether (PMVE); perfluoro elastomers; ethylene tetrafluoroethylene (ETFE); amorphous fluoropolymer (AF); and ethylene chlorotrifluoroethylene (ECTFE); polychlorotrifluoroethylene (PCTFE); polyvinylidene fluoride (PVDF); fluoroelastomers; vinylidene fluoride-hexafluoropropylene fluoroelastomer (VF2/HFP); vinylidene fluoride-hexafluoropropylene/tetrafluoro ethylene/hexafluoropropylene fluoroelastomer (VF2/tetrafluoro ethylene/HFP) terpolymer; or combinations thereof.

The disclosure also describes a dark-colored insulation material such as black, and light-color marking such as white.

An aspect of the disclosure is directed to a UV laser-markable insulation material containing a color pigment in an amount ranging from 1 to 3 phr, a UV laser-marking additive in an amount ranging from 1 to 2 phr, and a fluoropolymer or co-polymer in an amount of 100 phr. Phr or parts per hundred resin is a relatively standard unit of measurement in the industry where the ratio of part is to 100 parts of resin. Thus, the resin is always 100.

Another aspect of the disclosure is directed to a UV laser-markable insulation material, in which the an initial contrast is at least about 55%, at least about 60%, at least 65%, at least about 70%, at least about 72%, at least about 74%, at least about 76%, at least about 78%, at least about 80%, at least about 82%, at least about 84%, at least about 86%, at least about 88%, at least about 90%, at least about 95%, or even at least about 99% as measured according to AS4373 standards.

DETAILED DESCRIPTION

Figure 1:
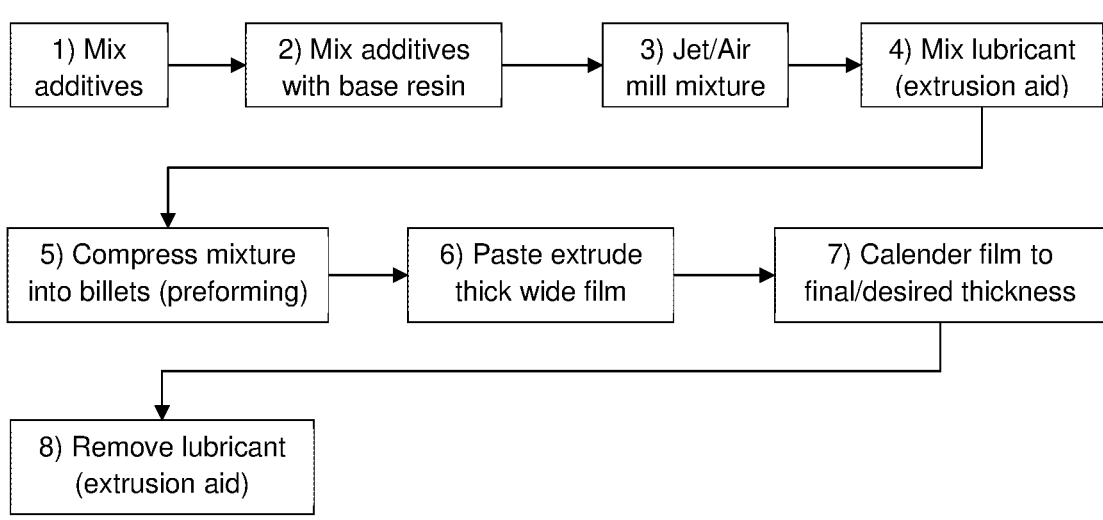
FIGS. 1 and 2 show flowcharts illustrative of the steps of making the technology described herein. Although not showing on the chart, subsequent steps can include stretching, slitting to a final/desired width. Narrow widths are usually used in wrapping conductors in the wire and cable manufacturing process. Steps 1 and 2 can be combined adding all and any additives with the base resin as a first mixing step (no need to "pre-mix" additives separately)—although pre-mixing additive separately in the dispersion of the ingredients is possible. The air/jet milling step is also optional.
Figure 2:
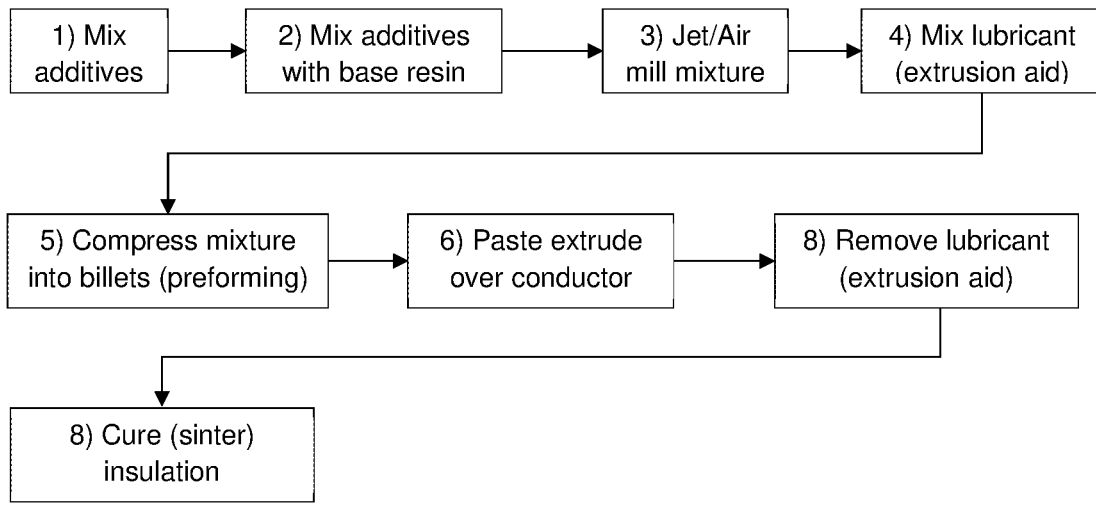

Laser marking aids product identification by creating permanent marks on polymeric surfaces with a visually controlled laser beam. Key application areas of laser marking include medical devices, aerospace/aircraft, automotive, brand packaging for consumer items, building, agriculture, electrical and electronic parts. Items or components commonly marked using laser beam include wire and cables, plugs, bottle caps, labels, switches, automobile panels, bumpers, headlamps and etc. Ink-jet printing and code stickers are well established traditional methods of writing on plastics but have drawbacks. Environmental impact of printing inks and pretreatment of parts are concerning. The issue of flexibility and durability of the marks has also prompted the need for better long-lasting marking alternatives. Laser marking does not use inks, pretreatment or solvents. The technique allows fast and easy customization on products with various geometries and computer controls resulting in high reproducibility and throughput. Different types of laser have been successfully used including:

(a) gas lasers: UV, $CO_2$, IR, HeNe and visible,
(b) solid state lasers: IR, near IR, Nd:YAG, visible and ruby, and
(c) semi-conductor lasers: Ga Al As, IR In Ga Al P and visible Ga As.

Three types of IR lasers which emits at wavelength >700 nm include diode, $CO_2$ and IR neodymium: solid state lasers all of which interact with materials through "hot" processes that thermally transform plastics. IR lasers are suitable for non-heat sensitive materials or where heat side effects are acceptable and are perfect for cutting and welding metals. UV and visible lasers such as UV neodymium: solid-state types emit light at shorter wavelength, 200-380 nm allow "cold" processing of materials as they generate little to no thermal effect on the material. High energy UV light breaks chemical or molecular bonds at material surface in a "zero heat" photo-ablation process. Additionally, UV light unlike IR light, can be focused on smaller spot sizes to create smaller features and achieve effective processing at modest energy levels.

Laser marking employs non-contact process that focuses high intensity beam of laser light on specific, highly localized areas to create a contrasting mark on the material surface. The interaction of the high energy laser light with the material during laser marking process depends on the material composition and properties as well as the wavelength and energy of the emitted light. As the target material (or plastic) absorbs laser light, the plastic interacts in six possible manner including carbonization and photoreduction, ablation, foaming, engraving, bleaching, color forming and bleaching. The most common surface reaction mechanism is termed thermal chemical carbonization where the local temperature of the absorption site and surrounding is raised by the energy absorbed resulting in thermal degradation of the polymer. The laser setting can be optimized to minimize surface carbonization residue. Another surface reaction obtained through the incorporation of steam-releasing additives during degradation results in foaming of the polymer. Examples of foaming agents include aluminum hydroxide and carbonates. If laser control is poor, foaming and ablation may have poor scratch resistance and are susceptible to pollution. Scratch resistance of laser prints by foaming depends on polymer, laser setting and the application. The scratch and abrasion resistance of base polymer remain unchanged after printing by carbonization, bleaching or color forming because the material surface is not affected by laser prints.

One of the critical requirements of laser marking process is mark quality. Addition of laser additives often aids mark qualities such as aesthetic, legibility and durability. The "cold" UV laser wire marking is popular in many industries including aerospace, automotive, wire and cable insulations. The UV laser beam changes the color of laser additives such as $TiO_2$ already incorporated in the wire insulation thereby creating blackish prints on the wire surface. There is a growing desire in the aerospace wire and cable industry for high contrast and more durable UV laser marking on fluoropolymer wire insulations in extreme temperature applications. The quality of the marks under low (<−160° C.) and high (>260° C.) temperature and long-term weather exposure is a key requirement quantified by mark contrast. For example, wire insulation mark contrast must be greater than 40% after a week of heat ageing at temperature above 260° C. It is believed that a higher initial contrast up to 65% will help to meet this post-heat ageing contrast requirement. As can be appreciated, $TiO_2$ changes to a darkish color when exposed to laser using approved laser etching methods and powers. The darkish color, while providing good contrast for light or white material, provides a less than satisfactory contrasts for dark materials.

Embodiments of this invention provide UV laser sensitive materials composed of inorganic metal oxide particles, formulated in dark-colored paste-extruded PTFE tapes for wire insulation and jacketing applications. The tape and wire samples were marked using Spectrum Technologies' Nova 50-100i laser wire marker compliant with AS5649 standards to produce blackish and white prints that resulted from "cold" photo-ablation process. Several material-dependent factors that affect laser print contrast are identified and optimized to formulate PTFE tape construction based on an experimentally determined "markability" response factor ($M_C$) and background luminance ($L_B$) threshold to maximize the mark or print contrast.

While the technology described herein relates to marking extruded tapes that are wrapped around wires to provide insulation, among other things, for the wires, the technology is not limited to extruded tapes, such as PTFE tapes, to wrap around wires. The compositions described herein may be formed and extruded over a wire or wires to form an extruded wire and or an over molded wire. The composition would be an extruded wire or wires with a dark extruded material that is UV laser markable with a high contrast light marking.

Embodiments of the present disclosure are generally directed to UV laser-markable dark-colored (such as carbon black) insulation material designed for use in wires or cables, including aerospace/aircraft wires and cables, to produce light-color (such as white) marking with high initial laser-mark contrast.

In one embodiment of the invention, a UV laser-markable dark-colored insulation material is fabricated by paste extrusion of powder additive mixture composed of about 1-20 part per hundred resin (phr) photosensitive additive, about 1-30 phr color pigment and fluoropolymer resin.

In another embodiment, a UV laser-markable dark-colored insulation material is produced by compounding fluoropolymer-additive blends in certain proportions and fabricated by paste extrusion of mixture powder into tapes, for example, using a concentration of about 1-20 phr in the compounded additive mixture.

One embodiment of the invention provides a UV laser-markable dark-colored insulation material that produces light-color marking with a high initial contrast. The UV laser-markable dark-colored insulation material comprises, in an exemplary embodiment: (i) a fluoropolymer of about 100 phr; (ii) a color pigment in an amount ranging from about 1 to 20 phr; and (iii) a UV laser-marking additive in an amount ranging from about 1 to 20 phr.

According to one embodiment of the invention, the UV laser-markable dark-colored insulation material comprises: a fluoropolymer such as polytetrafluoroethylene (PTFE); a UV laser-marking additive such as a mixture of mica, titanium dioxide, silicon dioxide, and antimony-doped tin oxide or mica coated with titanium dioxide, silicon dioxide, and antimony-doped tin oxide; and a color pigment including dark colors such as black, blue, red, brown, green, orange, or the like.

According to another embodiment of the invention, the dark-colored insulation material can be black, and light-color marking such as white.

According to another embodiment of the invention, the UV laser-markable insulation material comprises a color pigment in an amount ranging from about 1 phr to about 3 phr, a UV laser-marking additive in an amount ranging from about 1 phr to about 2 phr, and a fluoropolymer in an amount of 100 phr.

According to another embodiment of the invention, the UV laser-markable dark-colored insulation material may comprise a polymeric material selected from the group consisting of: perfluoroalkoxy alkanes (PFA or PFAs when plural); polytetrafluoroethylene (PTFE); fluorinated ethylene propylene (FEP) and its copolymers; expanded-polytetrafluoroethylene (ePTFE or EPTFE); expanded-fluorinated ethylene propylene (eFEP or EFEP); perfluoromethylvinylether (PMVE); perfluoro elastomers; ethylene tetrafluoroethylene (ETFE); amorphous fluoropolymer (AF); and ethylene chlorotrifluoroethylene (ECTFE); polychlorotrifluoroethylene (PCTFE); polyvinylidene fluoride (PVDF); fluoroelastomers; vinylidene fluoride-hexafluoropropylene fluoroelastomer (VF2/HFP); vinylidene fluoride-hexafluoropropylene/tetrafluoro ethylene/hexafluoropropylene fluoroelastomer (VF2/tetrafluoro ethylene/HFP) terpolymer; or combinations thereof.

According to another embodiment of the invention, the UV laser-markable dark-colored insulation material may comprise a blend of polymeric materials, for example, PTFE can be a "homopolymer" PTFE (made only by multiple TFE monomers) or a modified polymer or a copolymer (made of a combination of TFE with another monomer such as PPVE). PTFE can be a homopolymer or a copolymer grade.

According to one aspect of the invention, the initial contrast between markings and background is significantly higher than what is currently available in the industry for dark colored insulating materials. The dark-colored insulating materials of this invention, when marked with commercial UV laser markers, in compliance with AS5649 standard, produce white markings on black fluoropolymer insulating material with a contrast higher than or equal to 70%.

In certain embodiments, the insulation material can have an initial contrast ratio of at least about 55%, at least about 60%, at least about 65%, at least about 70%, at least about 72%, at least about 74%, at least about 76%, at least about 78%, at least about 80%, at least about 82%, at least about 84%, or at least about 86% as measured in compliance with AS4373 standard.

In other embodiments, the insulation material can have an initial contrast ratio in a range of any of the minimum and maximums provided above, such as in a range of about 55% to about 99%, about 60% to about 99%, about 65% to about 99%, about 70% to about 99%, about 75% to about 99%, about 80% to about 99%, or even about 85% to about 99% as measured in compliance with AS4373 standards.

In compliance with AS5649 and AS4373 standards, the contrast ratio is a measure of the difference in luminance of the lighter surface (conventionally, the insulation background) and the darker surface (conventionally, markings' luminance compared to the luminance of the insulation background). Contrast ratio is a well-understood measurement in the art. As used herein, the contrast ratio can be determined according to the following equation:

$$C=[(L_b-L_m)/L_d]\times100\%$$

where C is the contrast ratio, $L_b$ is the luminance of the background material, and L m is the luminance of the mark. In the above equation, luminance is defined as "the quantitative measurement of the visible light reflected from a surface." The luminance is determined by a calibrated electrical photometer which incorporates a photopic filter to simulate the response of the human eye. As can be appreciated, the contrast ratio as shown here is for conventional material where the insulation background is lighter, which results in a higher luminance, and the marked material is darker, which results in a lower luminance.

In certain embodiments, the UV laser-marking additive materials can be a mixture of mica, titanium dioxide, silicon dioxide, and antimony-doped tin oxide, mica coated with titanium dioxide, silicon dioxide, and antimony-doped tin oxide, or the like. One coloring agent that worked satisfactorily included Iriotec08825 and Iriotec08820.

In certain embodiments, the UV laser-marking additive materials can be a mica coated with titanium dioxide, silicon dioxide, and antimony-doped tin oxide, in which the antimony-doped tin oxide ($SnO_2$:Sn) is the outermost coating, comprising at least 30% of the coating material. It is believed satisfactory markings are achievable when the $SnO_2$:Sn is no more than 50% of the coating material. In other words, in certain embodiments, the $SnO_2$:Sn may be above zero and at least 30%. In other embodiments, the $SnO_2$:Sn may be no more than 50%. In yet other embodiments, the $SnO_2$:Sn may be between 30% and 50%.

According to one aspect of the invention, the UV laser-marking additive materials is a mica coated with titanium dioxide, silicon dioxide, and antimony-doped tin oxide. The laser-marking additive material is a light gray odorless powder having a density of 3.5 to 3.6 g/cm$^3$ at 68° F., with a particle size of less than 15 μm.

According to another aspect of the invention, the UV laser-marking additive materials can be combined with other functional additives that are known to improve or enhance certain properties, for example: Calcium fluoride and Molybdenum disulfide can enhance abrasion resistance (the amount can be varied in order to achieve a desired result, for example, Calcium fluoride and Molybdenum disulfide may be loaded up to 55 phr; and Boron nitride can enhance thermal conductivity, which may be loaded up to 45 phr.

I. EXAMPLES

A. Materials and Processing

Two grades of PTFE fine powder paste extrusion resin including a homopolymer (with mean particle size, $D_{50}$ of about 500 μm) and a modified PTFE ($D_{50}$ of about 500-640 μm) were used. The laser-marking additive materials included a mixture of mica, titanium dioxide, silicon dioxide, and antimony-doped tin oxide, mica coated with titanium dioxide, silicon dioxide, and antimony-doped tin oxide, or the like. One such agent that worked satisfactorily includes Iriotec08825 or Iriotec®8820. The color pigment used in certain embodiments include commercially available carbon black powder pigments.

Samples of film (or tapes) were fabricated by paste extrusion. Dry mixtures of the resin and fillers were blended with a PK blender and milled in a jet air apparatus to break agglomerates and disperse the additive uniformly. Next, the mixture was wet mixed by adding an aliphatic hydrocarbon lubricant as a process aid. The wet mixture was sieved to break up wet aggregates, and then allowed to incubate for 16-24 hours. The materials were cold pressed into billets to eliminate air voids and extruded in a ram extruder through a flat slit die. The extrudate was calendered to produce a thin film which travels over heated cans to evaporate the lubricant. Thermogravimetric analysis (TGA) of film samples shows wt. % loss during processing and pre-blending loadings were adjusted accordingly. The film was slit into narrow strips and wrapped on a wire conductor according to AS22759/87 and AS22759/92 standards for marking and testing. Tape and wire samples were marked using Spectrum Technologies' Nova 50-100i laser wire marker per AS5649 standard. The mark contrast was determined as follows ("ST-Report-ST0005-CONTRAST-FORMULAE-FOR-USE-WITH-CONTRAST." https://www.spectrumtech.com/wp-content/uploads/2014/06/ST-Report-ST0005-CON-TRAST-FORMULAE-FOR-USE-WITH-CONTRAST.pdf):

$$K_c=[(L_h-L_l)/L_h]\times100\% \qquad (1)$$

$K_c$=Contrast (can be between 0 and 100%)
$L_h$=Luminance of Higher Luminance area
$L_l$=Luminance of Lower Luminance area
$L_h>L_l$, which is a truism as the higher luminance material by definition has a luminance greater than the lower luminance material As now can be appreciated, the formula outlined above needs to be modified to accommodate the technology of the present application. Conventionally, the background material was lighter and had a higher luminance Using the technology of the present application, the background material is dark, such as black, and has a lower luminance than the marking. In other words, in contrast to convention, the present technology has a lower luminance background and a higher luminance marking. Thus, equation (1) has been modified from the traditional to accommodate the present technology and still arrive at a proper contrast reading. $L_h$, consistent with this technology, is the luminance of the marking while $L_l$, consistent with this technology, is the luminance of the background.

Initial contrast was determined immediately after samples were marked. Heat-aged contrast was determined after marked samples were exposed to heat in an oven at 290°-310° C. for 168 hours. Several material-dependent and process-dependent factors believed to affect the interaction of the polymer composite with UV laser light were studied including:

(1) PTFE grades: homopolymer (TFE) and modified PTFE,
(2) UV-absorbing Laser additives: a mixture of mica, titanium dioxide, silicon dioxide, and antimony-doped tin oxide, mica coated with titanium dioxide, silicon dioxide, and antimony-doped tin oxide, or the like. One satisfactory agent includes, for example, Iriotec08825, Iriotec08820, or the like
(3) Additive loading (wt. %),
(4) Composite microstructure and crystallinity, and
(5) Heat stability of additive and base polymer.

One such agent that worked satisfactorily includes Iriotec08825 and Iriotec08820 were tested for initial and heat-aged contrast measurement. Table below provides the results of such initial and post-heat treatment measurements (heat-aged contrast):

| Sample ID | Content | Initial contrast (%) | Heat-aged contrast (%) |
|-----------|---------|---------------------|------------------------|
| BLACK 1 | 1 phr Iriotec ®8820 | 78 | 72 |
| BLACK 3 | 1 phr Iriotec ®8825 | 69 | 52 |

The data indicate that the contrasts differ significantly from what is known in the art by creating light markings on black background fluoropolymer upon UV laser irradiation. One such agent that worked satisfactorily includes Iriotec08820 which provided both initial and heat-aged marking contrast ≥70%.

Unlike CH-containing polymers, fluoropolymers (containing mainly CF groups) are ablated and not carbonized when irradiated with laser light. For this reason, these fluoropolymers are inherently not laser-markable without incorporating additives that produce marks when irradiated with laser light. The degree of copolymer modification in PTFE may also affect the laser "markability".

The effect of PTFE grades was studied by evaluating a homopolymer (virgin) and modified PTFE grades. To study the effects of crystallinity on laser print contrast, samples of the films (0.002 in.) were sintered in an oven and cooled to room temperatures at different rates including: (a) cooled at 124° C./min; (b) cooled at 36° C./min; (c) cooled at 8° C./min and (d) cooled at 36° C./min. The crystallinity of composite film was determined using differential scanning calorimeter (DSC) by heating the samples from 25-400° C. at 5° C./min The crystallinity was estimated as the ratio of the average heat of fusion (J/g) of sample to heat of fusion of 100% crystalline PTFE which has been reported as 82 J/g (R. J. Lehnert, P. J. Hendra, N. Everall, and N. J. Clayden, "Comparative quantitative study on the crystallinity of poly (tetrafluoroethylene) including Raman, infra-red and 19F nuclear magnetic resonance spectroscopy," Polymer, vol. 38, no. 7, p. 1521-1535 (March 1997)).

Different commercial grades of laser additives including $TiO_2$-based pigment, a mixture of mica, titanium dioxide, silicon dioxide, and antimony-doped tin oxide, mica coated with titanium dioxide, silicon dioxide, and antimony-doped tin oxide, and the like. One satisfactory agent includes Iriotec08825, Iriotec08820, or the like. Other additives including non-$TiO_2$ materials and propriety blends were evaluated at weight % ranging from 0-10%. $TiO_2$ is a material commonly used as whitening pigment and filler in composites for aerospace, aircraft wire and cable applications and since the late 80s has been used as laser additives due to its optical properties such as color change after UV laser absorption. Optical properties of rutile $TiO_2$ such as high tint strength (or hiding power) and blue undertone promote high print contrast by improving the luminance and opacity. To improve the performance of titanium dioxide pigments in many end-use applications, the material is coated with inorganic materials such as alumina, silica, zirconia and tin oxide for durability and organic materials including polyols, amines, silicones and siloxanes for improved dispersion and hydrophobicity. These organic coatings are UV-absorbing and as such play a role in the UV laser mark legibility of $TiO_2$-filled polymeric composites. High purity $TiO_2$-based additives containing over 97% $TiO_2$ were identified as most effective for high dark marking initial contrast. Additive such as mica coated with titanium dioxide, silicon dioxide and antimony-doped tin oxide are effective for white markings with high contrast.

B. Exemplary Compositions

The materials and process disclosed herein provide a high contrast durable mark on dark-colored PTFE film for insulated wire and cable applications. Generally, high purity $TiO_2$-based pigment with trace amount of inorganic and organic coating offer high UV laser mark contrast. These are pigments with over 97% $TiO_2$ purity with low amount of alumina coating with or without organic coating treatment to improve dispersion in fluoropolymer and other types of resins. The UV laser-markable dark-colored wire insulation material from one aspect of this invention laser-marking additive comprising mica coated with titanium dioxide, silicon dioxide, and antimony-doped tin oxide provides at least 70% initial contrast in black fluoropolymer film, which was identified using experimentally determined factors referred to as "markability" response factor ($M_C$) and background luminance ($L_B$) threshold:

$$M_C = (K_c * L_b)/F_C \qquad (2)$$

$K_C$=Contrast
$L_B$=Luminance of Background
FC=Filler contents (wt. %)

It then follows from equation (2) that for a set of additives that provides relatively the same mark luminance, $M_C$ can be maximized with high luminance at low additive loading, that is $M_C=(K_c-L_b)/FC$. The "markability" response factor assumes maximum background luminance, a material-dependent property of the base polymer, has been achieved even after processing and sintering. For this reason, it is recommended that high matte material such as $SiO_2$ pigments or pigment coating that lowers base polymer luminance should be avoided or minimized for high contrast application when possible. Additionally, $M_C$ is maximized at lower filler content. This helps to quickly screen and identify highly effective UV laser additive systems that provide cost benefits and minimize adverse effect of high filler loading on mechanical, optical and electrical properties of the film. These highly effective UV laser additives are photo-sensitive materials that undergo deep color change when irradiated with high intensity UV laser light. The materials reach the maximum mark contrast at low wt. % without excessively modifying the crystalline morphology of the composite film in a manner detrimental to the film's "markability". For this reason, these materials provide high contrast and durable mark with both homopolymer and modified PTFE. However, modified PTFE (with lower crystallinity) aids high contrast with some laser additives as disclosed in this disclosure.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, and/or process step or steps, to the objective, spirit and scope of the present invention. All such modifications are intended to be within the scope of the claims appended hereto.

What is claimed is:

1. A UV laser-markable dark-colored insulation material that can produce a light-color marking with a high initial contrast of at least about 55% as measured according to AS4373 standards, wherein the insulation material comprises:

(i) fluoropolymer up to 100 parts;

(ii) color pigment configured to render the insulation material dark-colored in an amount ranging from 1 to 20 phr based on the fluoropolymer; and (iii) UV laser-marking additive configured to produce the light-color marking on the dark-colored insulation material in an amount ranging from 1 to 20 phr based on the fluoropolymer wherein the UV laser-marking additive comprises a mixture of mica, titanium dioxide, silicon dioxide, and antimony-doped tin oxide or mica coated with titanium dioxide, silicon dioxide, and antimony-doped tin oxide.

2. The UV laser-markable insulation material of claim 1, wherein the fluoropolymer is selected from the group consisting of: perfluoroalkoxy alkanes (PFA or PFAs when plural); polytetrafluoroethylene (PTFE); fluorinated ethylene propylene (FEP) and its copolymers; expanded-polytetrafluoroethylene (ePTFE or EPTFE); expanded-fluorinated ethylene propylene (eFEP or EFEP); perfluoromethylvinylether (PMVE); perfluoro elastomers; ethylene tetrafluoroethylene (ETFE); amorphous fluoropolymer (AF); ethylene chlorotrifluoroethylene (ECTFE); polychlorotrifluoroethylene (PCTFE); polyvinylidene fluoride (PVDF); fluoroelastomers; vinylidene fluoride-hexafluoropropylene fluoroelastomer (VF2/HFP); vinylidene fluoride-hexafluoropropylene/tetrafluoro ethylene/hexafluoropropylene fluoroelastomer (VF2/tetrafluoro ethylene/HFP) terpolymer; and combinations thereof.

3. The UV laser-markable insulation material of claim 1, wherein the fluoropolymer is PTFE.

4. The UV laser-markable insulation material of claim 1, wherein the color pigment includes dark colors selected from the group consisting of black, blue, red, brown, green, and orange.

5. The UV laser-markable insulation material of claim 1, wherein the dark-colored insulation material is black and the light-color marking is white.

6. The UV laser-markable insulation material of claim 1, wherein an initial contrast is at least about 60%, at least 65%, at least about 70%, at least about 72%, at least about 74%, at least about 76%, at least about 78%, at least about 80%, at least about 82%, at least about 84%, or at least about 86%, as measured according to AS4373 standards.

7. The UV laser-markable insulation material of claim 1, wherein the amount of color pigment ranges from 1 to 3 phr.

8. The UV laser-markable insulation material of claim 1, wherein the amount of UV laser-marking additive ranges from 1 to 2 phr.

9. The UV laser-markable insulation material of claim 1, wherein the amount of fluoropolymer is 80, 90 or 100 parts.

10. The UV laser-markable insulation material of claim 1, wherein the UV laser-markable insulation material is an extruded tape.

11. The UV laser markable insulation material of claim 1, wherein the UV laser-markable insulation material is configured to be extruded over a wire prior to marking.

12. The UV laser markable insulation material of claim 1, wherein a heat-aged contrast is greater than 40%.

13. The UV laser markable insulation material of claim 11, wherein the heat-aged contrast is greater than 40%.

\* \* \* \* \*